United States Patent
Pino

(10) Patent No.: US 9,913,460 B2
(45) Date of Patent: Mar. 13, 2018

(54) AQUARIUM SYSTEM

(71) Applicant: Fredrick Charles Pino, Naperville, IL (US)

(72) Inventor: Fredrick Charles Pino, Naperville, IL (US)

(*) Notice: Subject to any disclaimer, the term of this patent is extended or adjusted under 35 U.S.C. 154(b) by 0 days.

(21) Appl. No.: 15/201,799

(22) Filed: Jul. 5, 2016

(65) Prior Publication Data

US 2018/0007873 A1 Jan. 11, 2018

(51) Int. Cl.

| | |
|---|---|
| *A01K 63/04* | (2006.01) |
| *A01K 63/00* | (2017.01) |
| *A01K 63/06* | (2006.01) |
| *C02F 3/32* | (2006.01) |
| *C02F 1/00* | (2006.01) |
| *B01D 29/27* | (2006.01) |
| *B01D 24/20* | (2006.01) |
| *C02F 103/20* | (2006.01) |

(52) U.S. Cl.
CPC .......... *A01K 63/045* (2013.01); *A01K 63/003* (2013.01); *A01K 63/042* (2013.01); *A01K 63/047* (2013.01); *A01K 63/065* (2013.01); *B01D 24/205* (2013.01); *B01D 29/27* (2013.01); *C02F 1/001* (2013.01); *C02F 3/322* (2013.01); *B01D 2101/04* (2013.01); *B01D 2201/48* (2013.01); *C02F 2103/20* (2013.01)

(58) Field of Classification Search
CPC .. A01K 63/045; A01K 63/042; A01K 63/047; A01K 63/003; A01K 63/065; C02F 3/22; C02F 1/001; C02F 2103/20; B01D 29/27; B01D 24/205; B01D 2201/48; B01D 210/48; B01D 2101/04

USPC .... 210/167.21, 167.22, 167.25, 167.26, 602; 119/259, 260, 261

See application file for complete search history.

(56) References Cited

U.S. PATENT DOCUMENTS

| | | | |
|---|---|---|---|
| 3,785,494 A | 1/1974 | Sama | |
| 3,971,338 A | 7/1976 | Alexson | |
| 4,684,462 A | 8/1987 | Augustyniak | |
| 4,687,575 A | 8/1987 | Grose | |
| 4,851,112 A * | 7/1989 | Schlensker | .......... A01K 63/045 119/260 |
| 4,880,549 A | 11/1989 | Willinger et al. | |
| 5,054,424 A | 10/1991 | Sy | |

(Continued)

*Primary Examiner* — Fred Prince
(74) *Attorney, Agent, or Firm* — Erickson Law Group, PC

(57) ABSTRACT

An aquarium filtering and purifying system includes an upper display tank and a lower filter tank. The water from the upper tank can be delivered to the lower tank to a filter, such as within a surrounding filter fabric or membrane, such as a filter sock. An air tube can also be inserted into the filter tank to an unfiltered side of the filter, such as within the filter sock, to deliver air bubbles into the filter tank. The air tube can have an air stone at the end thereof to diffuse the air bubbles. Further air stones can be provided on an outside of the sock in the first compartment. Filtered water is delivered to a second compartment in the filter tank. The next compartment can have sand, and/or rocks and/or algae and/or a clean-up crew to assist in purifying the water. Water from the second compartment then passes to a third compartment, through a bubble trap, and then is pumped back to the display tank. Alternatively, the first compartment can be provided with a macro algae bed instead of a filter sock.

19 Claims, 4 Drawing Sheets

(56) References Cited

U.S. PATENT DOCUMENTS

| | | | |
|---|---|---|---|
| 5,084,164 A | | 1/1992 | Del Rosario |
| 5,164,089 A | | 11/1992 | Preston |
| 5,667,671 A | * | 9/1997 | Munsch .............. A01K 63/045 210/151 |
| 2003/0006177 A1 | | 1/2003 | Lari et al. |
| 2008/0004181 A1 | | 1/2008 | Yoshikawa et al. |
| 2009/0056638 A1 | * | 3/2009 | Ting ................... A01K 63/003 119/248 |

* cited by examiner

US 9,913,460 B2

AQUARIUM SYSTEM

BACKGROUND

The present invention is directed to aquarium systems used to display marine life. Aquariums and filtering systems for keeping and displaying marine life are known. In order to keep marine life healthy the water must be filtered and proteins and impurities removed.

A particular problem with most aquarium systems is the removal of harmful proteins and other impurities that are continuously produced by marine life in the aquarium. Filters must remove the proteins, amino acids, fatty acids and other proteinaceous material which accumulate and are concentrated in the water contained in the aquarium tank. Decaying food and fish feces produce ammonia and other nitrogen compounds which can be poisonous to the aquatic animals if allowed to accumulate in the aquarium.

Generally, conventional filtration and aeration systems usually involve the continuous flow of water between the aquarium tank and a filter. Sometimes the filter is mounted on the exterior side of one of the aquarium tank walls. Also, two tank systems are known wherein an upper tank serves as the display tank and a lower tank serves as a filter tank.

U.S. Pat. No. 5,084,164 describes a filter assembly having an upper tank and a lower tank. Water from the upper tank flows below to pass through a filter in the lower tank. A fraction of that water passes into a chamber that is fed air bubbles from below using an air stone to remove foam into a side container.

U.S. Pat. No. 3,971,338 describes a filter assembly having an upper tank and lower compartments. Water from the upper tank flows through filter material in the bottom of the tank to a recirculation pump. Additionally, water from an upper portion of the tank flows into an air compartment that is fed air bubbles from an air stone to create foam to be removed. Water at the bottom of this air compartment, along with the filtered water from the bottom of the tank can be passed through a chemical filter and then recirculated back to the tank by a pump.

U.S. Pat. No. 5,054,424 describes an upper tank/lower tank system. Water passes through a filter from the upper tank to the lower tank. Within the lower tank is an aeration section that uses an air pump and an air stone to inject oxygen into the water.

The present inventor has recognized a need for an effective aquarium filtering and purifying system for aquariums. The present inventor has recognized a need to create a filtering and purifying system for aquariums wherein equilibrium between the animals, plants, and bacteria can be maintained for extended periods of time. The present inventor has recognized a need to provide a simplified filtering and purifying aquarium system for the home at low cost, particularly suited for sea water aquariums.

The present inventor has recognized a need to provide a filtering and purifying aquarium system that is simple to operate and maintain. The present inventor has recognized a need to provide a filtering and purifying aquarium system that may easily be added to existing home aquariums.

SUMMARY

An exemplary embodiment of the invention comprises an aquarium filtering and purifying system that includes an upper display tank and a lower filter tank. The water from the upper tank can be delivered to the lower tank to a filter, such as within a surrounding filter fabric or membrane, such as a filter sock. An air tube can also be inserted into the filter tank to an unfiltered side of the filter, such as within the filter sock, to deliver air bubbles into the filter tank. The air tube can have an air stone at the end thereof to diffuse the air bubbles. Filtered water is delivered to a second compartment in the filter tank. The next compartment can have sand, and/or rocks and/or algae and/or a "clean-up crew" to assist in purifying the water. A clean-up crew typically includes snails, crabs, shrimps, and/or starfish that clean up non-living organic matter and keep algae under control.

Water from the second compartment then passes to a third compartment, through a bubble trap, and then is pumped back to the display tank.

Alternatively, the first compartment can be provided with a macro algae bed instead of a filter sock.

The system is particularly advantageous for filtering and purifying sea water aquariums. For a new display tank, the tank must be "cycled" to produce a livable environment with a proper level of useful bacteria. The system allows for a decreased cycle time for fish to be placed in a new display tank, allowing a proper livable environment for a sea water tank in as little as three days. The system allows for the elimination of the need for water changes. The only step needed is to top off evaporated water every few days. The normal salinity for a sea water tank is 1.024 (specific gravity). The system can maintain low hypo-salinity (1.008 specific gravity) if needed for treating parasitic infestation, for an extended period of time, for 4 months or longer, without the need for water changes, or additives added to maintain a livable environment. Added water is typically reverse osmosis deionized ("RO DI") water.

Numerous other advantages and features of the present invention will become readily apparent from the following detailed description of the invention and the embodiments thereof, from the claims and from the accompanying drawings.

DETAILED DESCRIPTION

Figure 1:
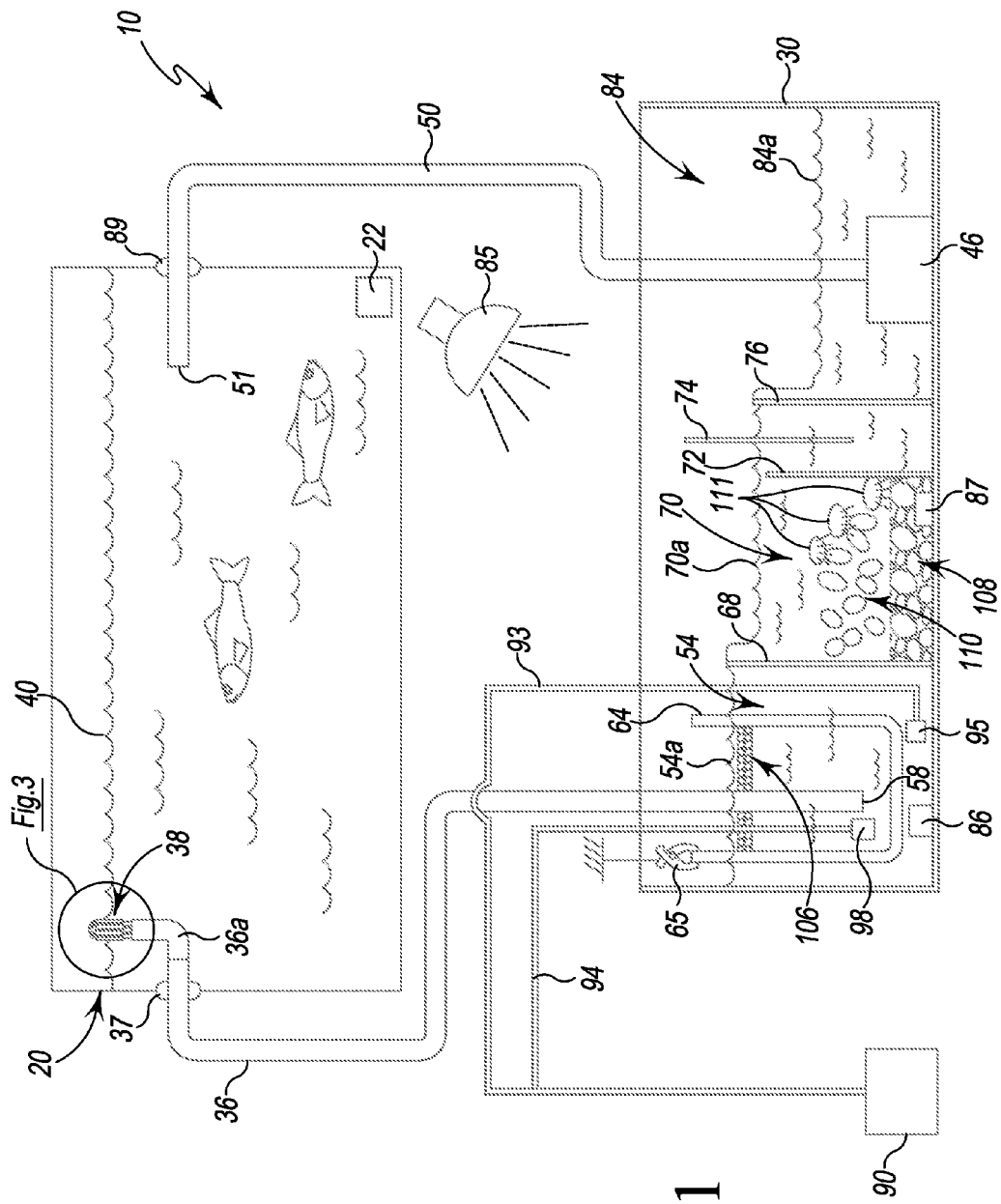
FIG. 1 is a schematic diagram of the aquarium system of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates an aquarium system 10 according to the present invention. The system includes a display tank 20 supported above a filter tank 30. The tanks have end walls, sidewalls and a bottom wall that can be composed of transparent glass or acrylic material. The display tank can have fish and other marine life, and rocks, sand, algae and clean-up crew. The display tank can include one or more wave-making devices 22. A tank filter tube 36 has an inlet 38 at and slightly below a water line 40 in the display tank 20. The filter tube delivers water into the filter tank 30. Water from the filter tank 30 is pumped from a water pump 46 through a recirculation tube 50 back to the display tank 20, with the end of the tube 50 being about one inch or so below the water level 40.

Figure 3:
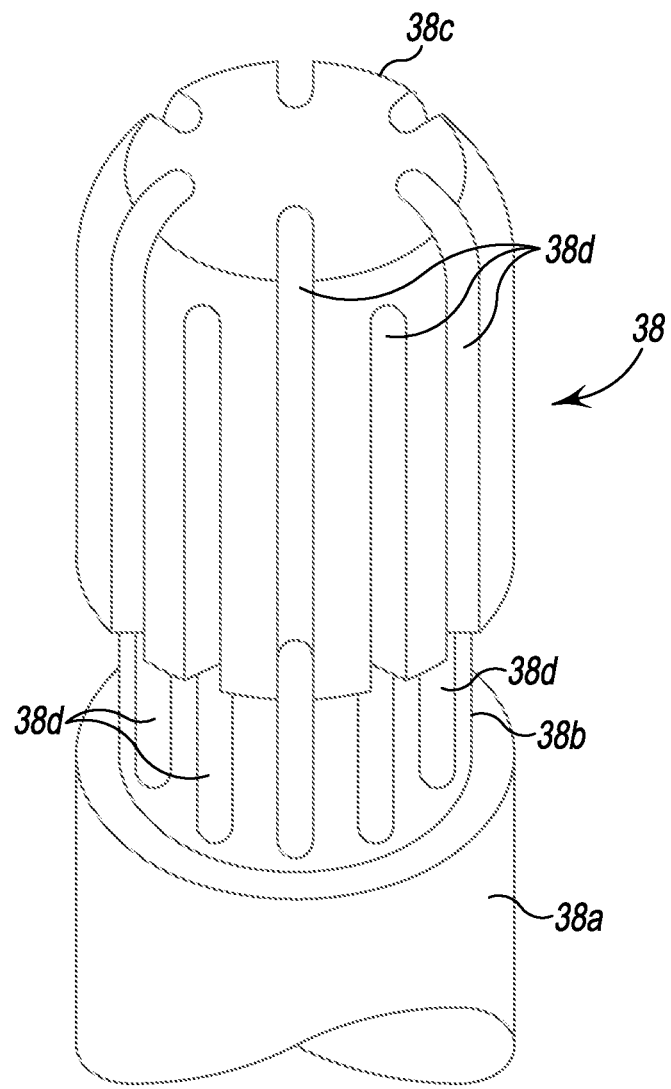
FIG. 3 is an enlarged perspective view taken from FIG. 1.

FIG. 3 illustrates the inlet 38 in more detail. The filter tube terminates in a 90 degree elbow 38a, facing upward. A short pipe nipple 38b connects the elbow 38a to a cap 38c, by threading or gluing to the cap and by press fitting into the elbow. The cap 38c and nipple 38b have vertical slots 38d cut through sidewalls thereof and through the cap end wall which are spaced apart around the circumference of the cap and nipple to allow water to pass into the elbow 38a and into the filter tube 36, but prevents fish from inadvertently entering the cap 38c and nipple 38b and then entering the elbow 38a. The cap 38c and the nipple 38b form a grate or screen for water entry into the inlet 38. The filter tube 36 extends from the elbow 38a through a side of the display tank 20 by use of a seal 37 as is known.

Returning to FIG. 1, the water level 40 is maintained at a height wherein the upward end of the elbow 38a is at about a 1 inch depth and the top wall of the cap 38c is above the water level 40. Effectively, the inlet 38 can skim the water surface at the water level 40.

Water from the filter tube 36 is fed into a first compartment 54 of the filter tank 30. The filter tube 36 delivers water through an open end 58 that is submerged within a filter sleeve or sock 64. The sock 64 is held upright at a desired elevation by use of one or more clamps 65 hung by wire from external structure. Water within the first compartments 54 spills over a baffle 68 and into a second compartment 70. Water within the second compartment 70 spills over a baffle 72, passes under a baffle 74 and spills over a baffle 76 into a third compartment 84.

The filter tank can be provided with one or more lamps 85 for radiating light onto the tank and one or more heaters 86, 87 for heating the water in the filter tank to a desired temperature appropriate for sustaining life in both tanks.

The pump 46 pumps water from the third compartment 84 through the recirculation tube 50 back into the display tank 20. The tube 50 passes through a wall of the tank through a seal 89 and has an outlet 51 about an inch or so below the surface 40.

An air pump 90 delivers pressurized air through an air feed tube 94 into the first compartments 54 and within the filter sock 64. An end of the tube 94 is connected to one or more air stones 98 which defuse the pressurized air into bubbles to aid in aeration of the water within the filter sock 64 and within the first compartments 54. Another air tube 93 can deliver air from the pump 90 to one or more air stones 95 within the first compartment on an outside of the sock 64. The air stones 95 provide air bubble induced turbulence in the first compartment to help move waste passing through the filter into the second compartment to feed algae and clean-up crew within the second compartment. In one embodiment there are two air stones 98 and six air stones 95.

The operation of the air stone 98 generating fine air bubbles causes protein within the water to foam within the filter sock at the water line and below. This foam 106 is contained within the filter sock. When the sock fills with foam and waste from the display tank, the sock can be removed and replaced with a clean sock, either a new sock or a cleaned sock. A bed of rocks 108 and/or macro algae 110 and/or a clean-up crew 111 can be contained in the second compartment for the purpose of purifying the water before return of the water to the display tank 20.

Figure 2:
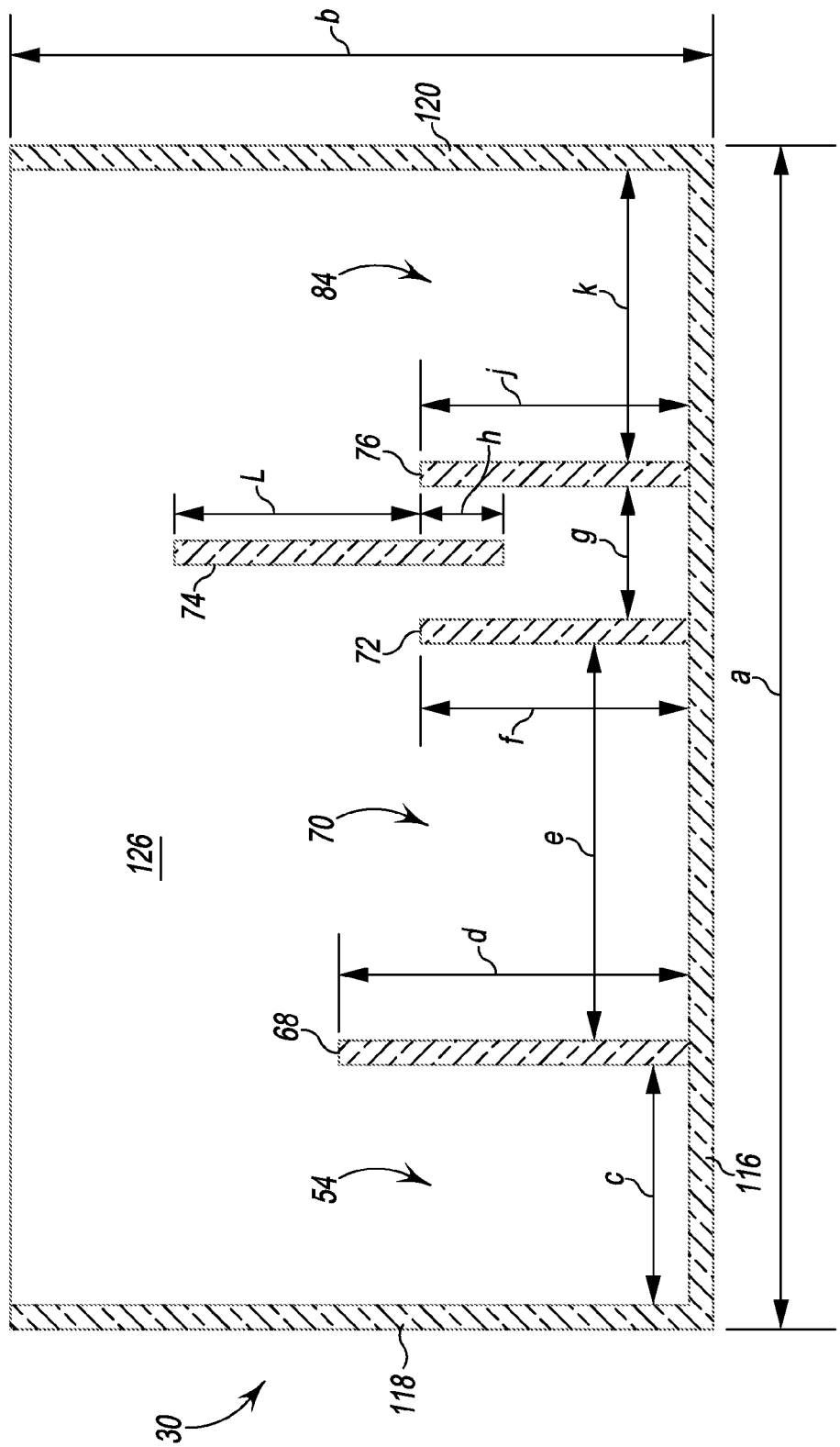
FIG. 2 is a sectional view of a filter tank taken from FIG. 1.

FIG. 2 illustrates the filter tank 30 in more detail. The filter tank is a rectangular fish aquarium tank having a bottom 116, sides 118, 120, a front wall (not shown) and a back wall 126. The top can be open. The baffles 68, 72, 76 are walls that extend between the front wall and the back wall, perpendicularly and are effectively sealed to the front wall and the back wall. The baffles 68, 72, 76 are sealed to the bottom 116 and extend vertically from the bottom 116. The baffle 74 is a wall that extends between the front wall and the back wall perpendicularly and is sealed to the front wall and back wall. The baffle is spaced from the bottom to allow water to flow beneath the baffle 74.

In the illustrated embodiment the filter tank has a lengthwise dimension a, a height dimension b, and a depth dimension (into the page). The first compartments 54 as a length c. The baffle 68 as a height d. The second compartment 70 as a length e. The baffle 72 as a height f. The baffle 74 has a height l above the top of the baffles 72, 76 and a height h below a top of the baffles 72, 76. The baffle 76 has a height j. The baffle 74 can be located in a lengthwise direction equally spaced between the two baffles 72, 76 and the two baffle 72, 76 are separated by a length g. The third compartment has a length k. The baffles 72, 74, 76 form a "bubble trap" to prevent air bubbles from reaching the water pump 46.

For one size tank, an exemplary depth dimension (into the page) is 12 inches. The corresponding other dimensions (in inches) are exemplary: a=48; b=20; c=13; d=11; e=21; f=9; g=4; h=7; i=5; j=9; k=10.

Because of the baffles and the control of the pump, water in the filter tank maintains a highest water level 54a in the first compartment, an intermediate water level 70a in the second compartment, and a lowest water level 84a in the third compartment.

Water enters the first compartment 54 from the display tank 20 below the water tube 40. Multiple fine bubble air stones 98 can be placed in compartment 54 all connected to the air tube 94 to deliver air bubbles into the compartment 54. The air stones 98 can be placed in the filter sock 64 or the compartment 54 can be instead contain or be filled with macro algae. Water flows from compartment 54 to the compartment 70 over a small waterfall formed by baffle 68. Compartment 70 can contain or be filled with a sand bed, and/or live rock, and/or macro algae and/or a clean-up crew.

Water enters compartment 84 from the three panel bubble trap 72, 74, 76. The trap can be configured to operate with the water level approximately 1 inch higher than a top elevation of the panels 72, 76. This eliminates turbulence in compartment 84. Water in compartment 84 returns to display tank via the submersible pump 46 and the recirculation tube 50.

The exemplary dimensions listed above for the tank 30 are consistent with a 55 gallon tank. This size tank is effective for a 125 gallon display tank 20. Advantageously the filter tank has sufficient volume such that upon loss of power, draining of water from the display tank 20 does not overflow the filter tank 30.

Figure 4:
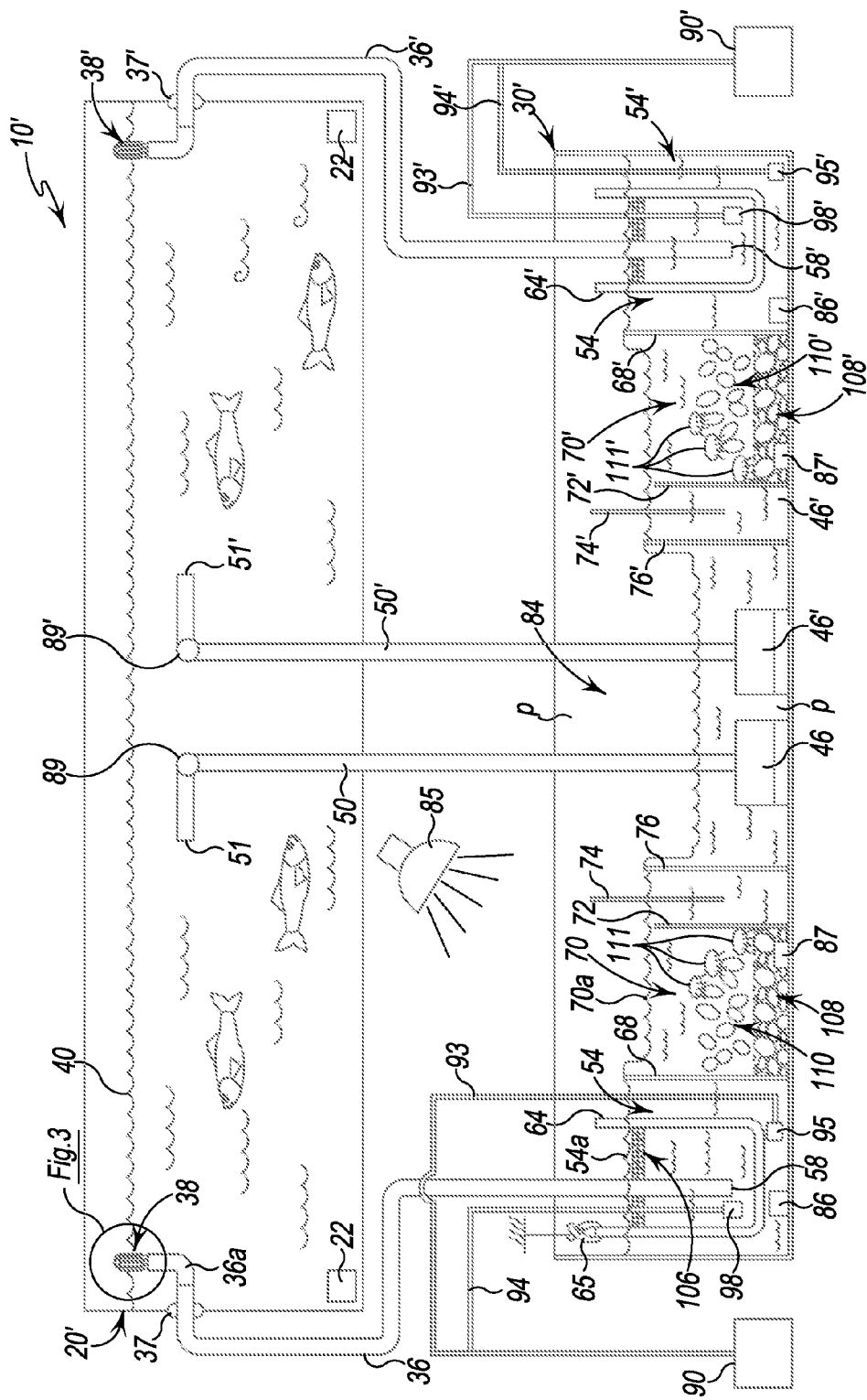
FIG. 4 is a schematic diagram of an alternate aquarium system of the present invention.

FIG. 4 illustrates a larger display tank 20' and a larger filter tank 30'. These tanks operate in like fashion to the tanks disclosed in FIGS. 1-3 with the same reference numbers used to describe identical elements. The filter tank is mirror image identical across the plane identified as P-P. The duplicated elements on the right side of P-P are indicated by the same reference number with a prime punctuation. As an example, the pump 46' delivering water through the tube 50' through a seal 89' into the tank 20' through an outlet 51' is a duplicate of the pump 46 delivering water through the tube 50 through the seal 89 into the tank 20'. According to this embodiment the left side of P-P operated as described in the embodiment disclosed in FIGS. 1-3.

According to this embodiment of FIG. 4, on the right side of P-P, water from the filter tube 36' is fed into a fourth compartment 54' of the filter tank 30'. The filter tube 36' delivers water through an open end 58' that is submerged within a filter sleeve or sock 64'. The sock 64' is held upright at a desired elevation by use of one or more clamps 65 hung by wire from external structure as shown on the left side of the filter tank. Water within the fourth compartments 54' spills over a baffle 68' and into a fifth compartment 70'. Water within the fifth compartment 70' spills over a baffle 72', passes under a baffle 74' and spills over a baffle 76' into the third compartment 84.

The filter tank 20' can be provided with one or more heaters 86', 87' for heating the water in the filter tank to a desired temperature appropriate for sustaining life in both tanks.

The pump 46' pumps water from the third compartment 84 through the recirculation tube 50' back into the display tank 20'. The tube 50 and the tube 50' pass through a back wall of the tank 20' through the seal 89 and a seal 89. The tubes 50 and 50' each has a respective outlet 51, 51' facing in opposite directions about an inch or so below the surface 40.

An air pump 90' delivers pressurized air through an air feed tube 94' into the fourth compartment 54' and within the filter sock 64'. An end of the tube 94' is connected to one or more air stones 98' which defuse the pressurized air into bubbles to aid in aeration of the water within the filter sock 64' and within the fourth compartments 54'. Another air tube 93' can deliver air from the pump 90' to one or more air stones 95' within the fourth compartment on an outside of the sock 64'. The air stones 95' provide air bubble induced turbulence in the fourth compartment to help move waste passing through the filter into the fifth compartment to feed algae and clean-up crew within the fifth compartment. In one embodiment there are two air stones 98' and six air stones 95'.

The operation of the air stone 98' generating fine air bubbles causes protein within the water to foam within the filter sock at the water line and below. This foam is contained within the filter sock. When the sock fills with foam and waste from the display tank, the sock can be removed and replaced with a clean sock, either a new sock or a cleaned sock. A bed of rocks 108' and/or macro algae 110' and/or a clean-up crew 111' can be contained in the fifth compartment for the purpose of purifying the water before return of the water to the display tank 20'.

According to the embodiment of FIG. 4, water in the display tank 20' flows from a central region toward opposite ends to the outlets 38, 38'. The water enters the filter tank 30' at opposite ends into the first and fourth compartments 54, 54' respectively. Water then flows toward the center of the filter tank, over the baffles 68, 68', then over the baffles 72, 72', then under the baffles 74, 74' and then over the baffles 76, 76' into the central third compartment 84 where two pumps 46, 46' return the water to the display tank 20'. Although two pumps 46, 46' are shown it is possible that a single pump is used. Although two air pumps 90, 90' are shown, it is possible that a single air pump is used to supply the air stones in both the first and fourth compartments.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An aquarium system comprising a display tank and a filter tank, the display tank elevated above the filter tank, a filter tube having an inlet end open to the display tank and an outlet end open into the filter tank, the outlet end delivering water from the display tank into a first compartment of the filter tank;
   the first compartments is defined by a first baffle which allows water from the first compartment to spill over the first baffle into a second compartment;
   a source of pressurized air communicating through an air tube wherein the air tube has an outlet end submerged within the first compartment, wherein air bubbles are provided into the first compartment;
   the second compartment defined by the first baffle and a second baffle, wherein the second baffle has a top elevation equal to or below a top elevation of the first baffle, wherein water is delivered from the second compartment to a third compartment spill over the second battle;
   wherein water moves sequentially from the first compartment to the second compartment to the third compartment;
   a water pump submerged in the third compartment, and a recirculation tube connected to an outlet of the water pump at one end and having an opposite end open into the display tank, the water pump and the recirculation tube delivering filtered water from the filter tank back to the display tank.

2. A system according to claim 1, comprising a third baffle and a fourth baffle, the third baffle arranged elevated from a bottom of the filter tank to allow water to pass under the third baffle, and the fourth baffle arranged extending from the bottom of the filter tank, the third baffle being spaced intermediate between the second baffle and the fourth baffle, the second, third and fourth baffles forming a bubble trap to prevent bubbles from entering the third compartment.

3. A system according to claim 2, wherein the second compartment contains one of a sand bed, a rock bed, clean-up crew or macro algae.

4. The system according to claim 2, wherein the second compartment contains a rock bed and macro algae or clean-up crew.

5. The system according to claim 1, comprising a filter arranged in the first compartment, the filter positioned between the outlet of the filter tube and the first baffle, wherein water spilling over the first baffle first passes through the filter.

6. The system according to claim 5, wherein the filter comprises a filter sock wherein the air stone and the filter tube outlet are located within the filter sock.

7. The system according to claim 6, wherein the filter sock extends to an elevation above the top elevation of the first baffle.

8. The system according to claim 2, wherein the second baffle has a top elevation that is below a top elevation of the first baffle.

9. The system according to claim 1, further comprising:
   a second filter tube having an inlet end open to the display tank and an outlet end open into the filter tank, the outlet end delivering water from the display tank into a fourth compartment of the filter tank;
   the fourth compartments is defined by a third baffle which allows water from the fourth compartment to spill over the third baffle into a fifth compartment;
   a source of pressurized air communicating through a second air tube wherein the second air tube has an outlet end submerged within the fourth compartment, wherein air bubbles are provided into the fourth compartment;

the fifth compartment defined by the third baffle and a fourth baffle, wherein the fourth baffle has a top elevation equal to or below a top elevation of the third baffle, wherein water is delivered from the fifth compartment to the third compartment spill over the fourth battle;

wherein water moves sequentially from the fourth compartment to the fifth compartment to the third compartment to be pumped back to the display tank.

10. An aquarium system comprising a display tank and a filter tank, the display tank elevated above the filter tank, a filter tube having an inlet end open to the display tank and an outlet end open into the filter tank, the outlet end delivering water from the display tank into a first compartment of the filter tank;

the first compartments is defined by a first baffle which allows water from the first compartment to spill over the first baffle into a second compartment;

a filter sock held within the first compartment and having an open end elevated above a top elevation of the first baffle, the outlet end of the filter tube located within the filter sock below the top elevation of the first baffle;

a source of pressurized air communicating through an air tube wherein the air tube has an outlet end submerged within the first compartment within the filter sock, wherein air bubbles are provided into the first compartment inside the filter sock;

the second compartment defined by the first baffle and a second baffle, wherein the second baffle has a top elevation equal to or below a top elevation of the first baffle, wherein water is delivered from the second compartment to a third compartment spill over the second battle;

wherein water moves sequentially from the first compartment to the second compartment to the third compartment;

a water pump submerged in the third compartment, and a recirculation tube connected to an outlet of the water pump at one end and having an opposite end open into the display tank, the water pump and the recirculation tube delivering filtered water from the filter tank back to the display tank.

11. A system according to claim 10, comprising a third baffle and a fourth baffle, the third baffle arranged elevated from a bottom of the filter tank to allow water to pass under the third baffle, and the fourth baffle arranged extending from the bottom of the filter tank, the third baffle being spaced intermediate between the second baffle and the fourth baffle, the second, third and fourth baffles forming a bubble trap to prevent bubbles from entering the third compartment.

12. A system according to claim 11, wherein the second compartment contains one of a sand bed, a rock bed, clean-up crew, or macro algae.

13. The system according to claim 11, wherein the second compartment contains a rock bed and macro algae or clean-up crew.

14. The system according to claim 11, wherein the second baffle has a top elevation that is below a top elevation of the first baffle.

15. A method of filtering a display tank for fish comprising the steps of:
providing a display tank;
providing a filter tank arranged to receive water from the display tank;
arranging that the water from the display tank is received into a first compartment of the filter tank;
arranging a pressurized air supply to deliver air bubbles into the first compartment;
arranging for the water delivered into the first compartment flows over a first baffle into a second compartment;
arranging rocks and/or sand and algae and/or a clean-up crew is arranged in the second compartment;
arranging for the water in the second compartment spills over a second baffle into a third compartment;
arranging a recirculation pump in the third compartment to deliver water from the filter tank to the display tank.

16. The method of claim 15, comprising the further step of arranging a filter within the first compartment and the step of arranging for the water delivered into the first compartment flows over a baffle into a second compartment is further defined in that the water first passes through the filter before entering the second compartment.

17. The method according to claim 16, wherein the step of arranging a pressurized air supply to deliver air bubbles into the first compartment is further defined in that the air bubbles are delivered into the unfiltered water in the first compartment.

18. The method according to claim 16, wherein the step of arranging a pressurized air supply to deliver air bubbles into the first compartment is further defined in that the air bubbles are delivered into both the unfiltered water and the filtered water in the first compartment.

19. The method of claim 15 comprising the further step of providing a bubble trap between the second and third compartments to prevent bubbles from entering the third compartment.

\* \* \* \* \*